(12) United States Patent
Kato et al.

(10) Patent No.: US 7,126,713 B1
(45) Date of Patent: Oct. 24, 2006

(54) COMMUNICATION TERMINAL APPARATUS AND METHOD

(75) Inventors: Tokunori Kato, Ichinomiya (JP); Susumu Chida, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 712 days.

(21) Appl. No.: 09/266,922

(22) Filed: Mar. 12, 1999

(30) Foreign Application Priority Data

Mar. 17, 1998 (JP) .................................. 10-066550
Mar. 23, 1998 (JP) .................................. 10-074062

(51) Int. Cl.
*G06F 15/00* (2006.01)

(52) U.S. Cl. .................... 358/1.16; 358/400; 358/404; 358/444; 379/100.01

(58) Field of Classification Search ................ 358/400, 358/404, 434, 436, 438, 439, 440, 443, 444, 358/1.16, 1.15, 1.17, 1.18; 379/100.01, 354
See application file for complete search history.

(56) References Cited

U.S. PATENT DOCUMENTS

| | | | | |
|---|---|---|---|---|
| 5,021,889 A * | 6/1991 | Yamamoto | .................. | 358/440 |
| 5,216,709 A * | 6/1993 | Wen et al. | .................. | 379/354 |
| 5,299,257 A * | 3/1994 | Fuller et al. | ............ | 379/100.05 |
| 5,305,372 A * | 4/1994 | Tomiyori | ..................... | 455/564 |
| 5,323,451 A * | 6/1994 | Yatsunami | ............. | 379/100.01 |
| 5,615,248 A * | 3/1997 | Norimatsu | .................. | 455/566 |
| H1802 H * | 9/1999 | Erwin et al. | ................. | 379/243 |
| 6,067,082 A * | 5/2000 | Enmei | ......................... | 345/174 |
| 6,111,661 A * | 8/2000 | Kim | ........................... | 358/434 |
| 6,333,702 B1* | 12/2001 | Hiyokawa et al. | .......... | 340/995 |
| 6,426,963 B1* | 7/2002 | Kim | ........................... | 370/524 |

\* cited by examiner

*Primary Examiner*—Joseph R. Pokrzywa
(74) *Attorney, Agent, or Firm*—Oliff & Berridge, PLC

(57) ABSTRACT

A communication terminal apparatus which includes a non-volatile memory device that stores parameters of various kinds, and a control device that performs an operation based on at least the parameters. The non-volatile memory device includes a read-only non-volatile memory, for example, a ROM, storing parameters regarding a plurality of geographical divisions, such as countries, areas and the like, and a re-writable non-volatile memory, for example, an EEPROM, capable of storing at least the parameters. When a geographical division is selected, the control device initializes the re-writable non-volatile memory on the basis of at least the parameters regarding the selected geographical division read from the read-only non-volatile memory, that is, the control device reads the parameters regarding the selected geographical division from the read-only non-volatile memory, and stores the parameters into the re-writable non-volatile memory.

16 Claims, 10 Drawing Sheets

COMMUNICATION TERMINAL APPARATUS AND METHOD

BACKGROUND OF THE INVENTION

1. Field of the Invention

The present invention relates to a communication terminal apparatus that operates based on parameters and the like stored in a non-volatile storage device.

2. Description of the Related Art

Due to different communication standards, specifications and the like in different countries, the specifications of communication terminal apparatuses for export need to be modified separately for their importing countries so that each communication terminal apparatus complies with the communication standards and the like of its importing country. Therefore, it is a normal practice in production of a communication terminal apparatus for export, to prepare a non-volatile memory dedicated to store parameters that are specifically for the importing country and then install the non-volatile memories into communication terminal apparatuses.

Thus, in a communication terminal apparatuses each incorporating such a dedicated non-volatile memory mounted on a control circuit board, the parameters and the like regarding a country once stored in the dedicated non-volatile memory cannot be changed to those regarding another country. Therefore, if the number of apparatuses for export to a given country is changed after a previously set number of apparatuses for the country have been produced, an excess inventory or a low inventory may immediately occur.

SUMMARY OF THE INVENTION

The present invention provides a communication terminal apparatus and method wherein the parameters and the like related to a plurality of countries, areas and the like, are pre-stored in a non-volatile memory device, and the parameters and the like corresponding to one of the countries, areas and the like can easily be selected. The invention also provides a communication terminal apparatus and method wherein a main program of the communication terminal apparatus is prevented from starting before the specification for a country is selected from pre-stored specifications for a plurality of countries and set. In this way, the main program is not started on the basis of a false specification that is incorrectly set and, therefore, an error in setting the specification or a failure to set the specification can be prevented and the product quality can be improved.

According to one aspect of the invention, there is provided a communication terminal apparatus including a non-volatile memory device that stores parameters of various kinds, and a control device that performs an operation based on at least the parameters. The non-volatile memory device includes a read-only non-volatile memory that stores parameters regarding a plurality of geographical divisions including countries and areas, and a rewritable non-volatile memory that is capable of storing at least the parameters. If a geographical division is selected, the control device initializes the rewritable non-volatile memory on the basis of at least parameters regarding the selected geographical division, the parameters being read from the read-only non-volatile memory.

The term "non-volatile memory device" includes a memory device that retains data and the like stored therein even if a predetermined power supply discontinues. The "read-only non-volatile memory", included in the non-volatile memory device, includes a non-volatile memory that prevents stored data and the like from being rewritten and that is dedicated for reading data or the like. The read-only non-volatile memory may be, for example, a ROM, diskette, IC card or the like. The "rewritable non-volatile memory", included in the non-volatile memory device, includes a non-volatile memory that allows stored data or the like to be rewritten. The rewritable non-volatile memory may be, for example, an EEPROM, RAM, or the like.

When a certain geographical division, that is, a certain country, area or the like, is selected, the control device reads the parameters regarding the selected geographical division from the read-only non-volatile memory storing the parameters regarding a plurality of geographical divisions, and then stores the read parameters into the rewritable non-volatile memory. Thus, the control device initializes the rewritable non-volatile memory on the basis of the parameters read from the read-only non-volatile memory. Therefore, the communication terminal apparatus of the invention makes it possible to change the parameters and the like regarding a country, area or the like even after the production of the communication terminal apparatus. Furthermore, since the rewritable non-volatile memory is initialized on the basis of the parameters read from the read-only non-volatile memory, the possibility of an input error or the like made by an inspector or the like is considerably reduced, and necessary parameters and the like can be easily and reliably selected and stored.

The above-described initialization of the rewritable non-volatile memory includes an operation of reading parameters regarding a selected geographical division from the read-only non-volatile memory and storing the parameters into the rewritable non-volatile memory, and may also include other operations or other manners of operations. The term "geographical divisions" includes countries or nations having substantially defined territories, and administrative districts or areas within countries, and may further include a region extending over a plurality of countries, and the like.

In the communication terminal apparatus, the parameters regarding the geographical divisions may include geographical division-specific parameters specific to the geographical division and non-geographical division-specific parameters other than the geographical division-specific parameters. If no geographical division-specific parameter has been stored in the rewritable non-volatile memory, the control device reads at least one geographical division-specific parameter regarding the selected geographical division and at least one non-geographical division-specific parameter regarding the selected geographical division from the read-only non-volatile memory, and stores the at least one geographical division-specific parameter and the at least one non-geographical division-specific parameter into the rewritable non-volatile memory.

The term "geographical division-specific parameter" includes a parameter that needs to be set separately for each geographical division, including, for example, parameters regarding the communication standards, the communication conditions, and the functions of telephone exchanges employed in a country, area or the like, and, furthermore, parameters regarding data setting and the like in such a geographical division. The "non-geographical division-specific parameter" includes parameters that are set separately for a user of the communication terminal apparatus, including parameters regarding a user telephone number, a user facsimile number, a transmitter data indicating a transmitter facsimile apparatus, a single-key dialing number, an abbreviated dialing number, and the like. The "non-geographical division-specific parameter" is not limited to the aforementioned parameters.

If no geographical division-specific parameter has been stored in the rewritable non-volatile memory and a geographical division is selected, the control device reads at least one geographical division-specific parameter and at least one non-geographical division-specific parameter regarding the selected geographical division, and stores the parameters into the rewritable non-volatile memory.

Since geographical division-specific parameters are stored into the rewritable non-volatile memory, it becomes possible to use the communication terminal apparatus in different countries having different communication standards, specifications and the like. Since non-geographical division-specific parameters are also stored into the rewritable non-volatile memory, it becomes possible to set, for example, parameters convenient for use by each user.

In the communication terminal apparatus, the parameters regarding the geographical divisions may include geographical division-specific parameters and non-geographical division-specifics other than the geographical division-specific parameters. If at least one geographical division-specific parameter regarding a first geographical division has already been stored in the rewritable non-volatile memory and a second geographical division is selected, the control device reads at least one geographical division-specific parameter regarding the selected second geographical division from the read-only non-volatile memory, and stores the at least one geographical division-specific parameter into the rewritable non-volatile memory.

Therefore, if at least one geographical division-specific parameter regarding a first geographical division has been stored in the rewritable non-volatile memory and a second geographical division is selected, the control device reads the geographical division-specific parameters regarding the selected second geographical division from the read-only non-volatile memory, and stores the geographical division-specific parameters into the rewritable non-volatile memory. In this case, the communication terminal apparatus does not rewrite the non-geographical division-specific parameters.

This manner of storing parameters is employed because this storing manner reduces the time needed to store parameters. That is, if the control device reads geographical division-specific parameters and non-geographical division-specific parameters from the read-only non-volatile memory, and stores the two types of parameters into the rewritable non-volatile memory, the quantity of parameters to be stored is large, so that a long time is needed to store all the necessary parameters into the rewritable non-volatile memory. On the other hand, if the control device stores only the geographical division-specific parameters regarding a newly selected geographical division, the quantity of parameters is small, so that the time needed to store the parameters into the rewritable non-volatile memory is reduced.

Furthermore, if stored parameters need to be changed to parameters regarding another geographical division due to, for example, a change of the importing country of the communication terminal apparatus, the non-geographical division-specific parameters stored in the rewritable non-volatile memory do not always need to be changed. Therefore, in this construction, the control unit writes only the geographical division-specific parameters regarding the newly selected geographical division in the aforementioned case The communication terminal apparatus may further include an input device that allows a user to rewrite parameters stored in the rewritable non-volatile memory, the parameters including a geographical division code.

Communication terminal apparatuses are produced in compliance with the communication standards, specifications and the like of their designated importing countries, and correspondingly exported. However, there are cases where a user in an area near a country border finds that adoption of the communication standards, specifications and the like of the neighboring country is more suitable to maximize the communication performance of the apparatus than adoption of the communication standards, specifications and the like of the user's country. Furthermore, a user may move to a foreign country. In such a case, this communication terminal apparatus allows a user to re-write the country or area code by using the input device.

According to another aspect of the invention, there is provided a communication terminal apparatus including a first specification storing device into which a plurality of specifications are pre-stored and a selector device that selects a specification from the first specification storing device. The communication terminal apparatus further includes a second specification storing device that stores the specification selected by the selector device, a determining device that determines whether the specification stored in the second specification storing device is a predetermined specification, and a control device that performs a control such that a main program starts if the determining device determines that the specification stored in the second specification storing device is the predetermined specification.

In a production line of this communication terminal apparatus, a specification is selected from the plurality of specifications stored in the first specification storing device, and the selected specification is stored into the second specification storing device. If the determining device determines that the selected specification is a predetermined specification, the control device starts the main program.

Therefore, unless a predetermined specification is selected from the plurality of specifications, the main program is not started. Consequently, it becomes possible to prevent a failure to set a predetermined specification selected from the plurality of specifications. Furthermore, it becomes possible to prevent the main program from being started on the basis of a false specification setting. It also becomes possible to improve the product quality.

In the above-described communication terminal apparatus, the specifications may include at least one parameter regarding a communication in a geographical division. If the specifications include parameters regarding a plurality of geographical divisions, for example, countries, areas and the like, the communication specifications of various countries can be pre-stored into the first specification storing device. Therefore, in a production line of the communication terminal apparatus, the communication specification of the designated importing country can be selected and stored into the second specification storing device. If the determining device determines that the selected communication specification is a predetermined specification, the control device starts the main program.

Therefore, unless a predetermined communication specification is selected from the plurality of communication specifications, the main program is not started. Consequently, it becomes possible to prevent a failure to set a predetermined communication specification selected from the plurality of communication specifications. Furthermore, it becomes possible to prevent the main program from being started on the basis of a false specification setting. It also becomes possible to improve the product quality.

In the communication terminal apparatus, the main program may operate on the basis of the specification stored in the second specification storing device.

Therefore, since the main program operates on the basis of the predetermined specification stored in the second specification storing device, it becomes possible to reliably prevent the main program from operating on the basis of a false specification. Furthermore, since the main program is not allowed to operate unless the predetermined specification is stored in the second specification storing device, it becomes possible to reliably prevent a failure to select the predetermined specification.

The communication terminal apparatus may further include an output device that outputs a parameter of the specification stored in the second specification storing device. Therefore, since the output device, such as a liquid crystal display or the like, is provided for outputting a parameter of the specification stored in the second specification storing device, it becomes possible for an operating person to know the parameters regarding, for example, a communication specification, stored in the second specification storing device, via the output device, when selecting a predetermined specification from the first specification storing device. As a result, it becomes possible to reliably prevent a failure to select the predetermined specification.

In the communication terminal apparatus, the first specification storing device may include a read-only non-volatile memory, and the second specification storing device may include a re-writable non-volatile memory. Therefore, the plurality of specifications may be pre-stored in the read-only non-volatile memory, included in the first specification storing device. A predetermined specification selected in a production line may be stored into the read-only non-volatile memory, included in the second specification storing device.

As a result, if a false specification, not a predetermined specification, is selected and stored into the second specification storing device in a production line, the second specification storing device can be initialized, so that the predetermined specification can be selected from the first specification storing device, and can be stored into the second specification storing device. Consequently, the quality of the communication terminal apparatus can be improved.

BRIEF DESCRIPTION OF THE DRAWINGS

Preferred embodiments of the present invention will be described in detail with reference to the following figures wherein.

DETAILED DESCRIPTION OF PREFERRED EMBODIMENTS

Preferred embodiments of the present invention in which the communication terminal apparatus of the invention is embodied in a facsimile apparatus will be described in detail hereinafter with reference to the accompanying drawings. However, the communication terminal apparatus is not limited to a facsimile apparatus but may be any type of communication apparatus capable of sending and/or receiving communication signals. For example, the communication terminal apparatus may be a wired or wireless telephone, video phone, computer assisted or intelligent television, personal digital assistant, computer, or the like.

The overall construction of a facsimile apparatus according to a first embodiment will be described with reference to FIG. 1, which is a perspective view of the facsimile apparatus.

Figure 1:
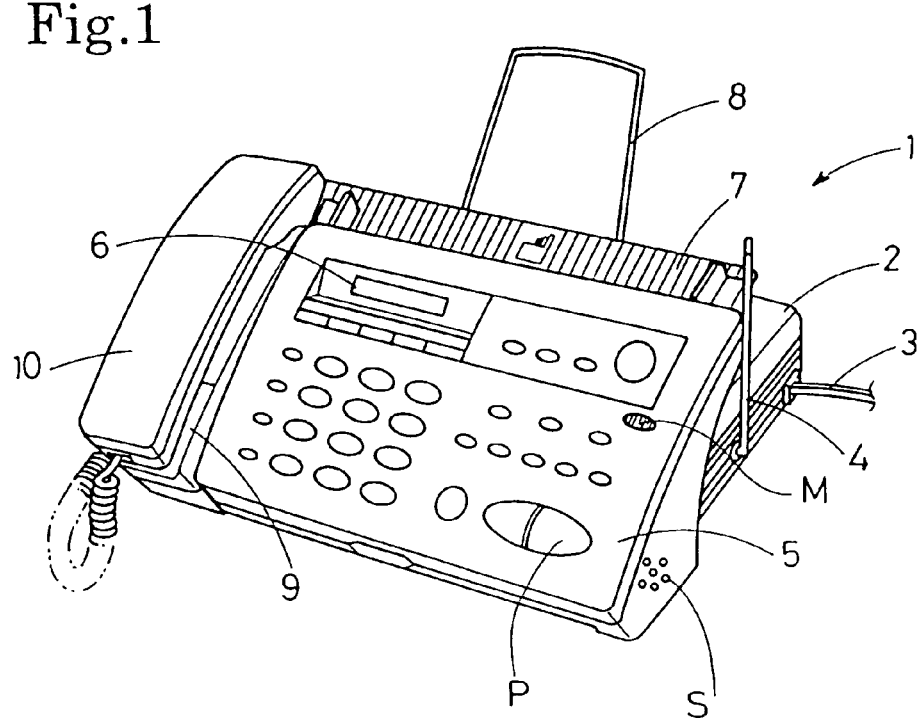
FIG. 1 is an external perspective view of a facsimile apparatus according to an embodiment of the invention.

Referring to FIG. 1, a facsimile apparatus 1 has an apparatus body 2. Connected to a right-side face of the apparatus body 2 are a power supply cord 3 and an antenna 4 for communication with a child apparatus (not shown). Provided in an upper face of the apparatus body 2 is an operating panel unit 5 including a display 6, for example, a liquid crystal display device or the like. A microphone M for inputting a voice message for an automatic answering function is disposed in a portion of the operating panel unit 5, the portion being near the antenna 4. A speaker S for outputting voices and sounds is disposed in a side face of the apparatus body 2.

Disposed in a rear portion of the apparatus body 2 is a document stacker 7 for setting a document or a stack of documents to be scanned. A sheet support 8 is disposed rearward of the document stacker 7. Disposed in a left-side portion of the apparatus body 2 is a handset base portion 9 on which a handset 10 is placed.

A start key P for starting facsimile transmission is disposed in a right-side lower portion of the operating panel unit 5. Various other keys needed to operate the facsimile apparatus 1 are arranged in the operating panel unit 5.

Figure 2:
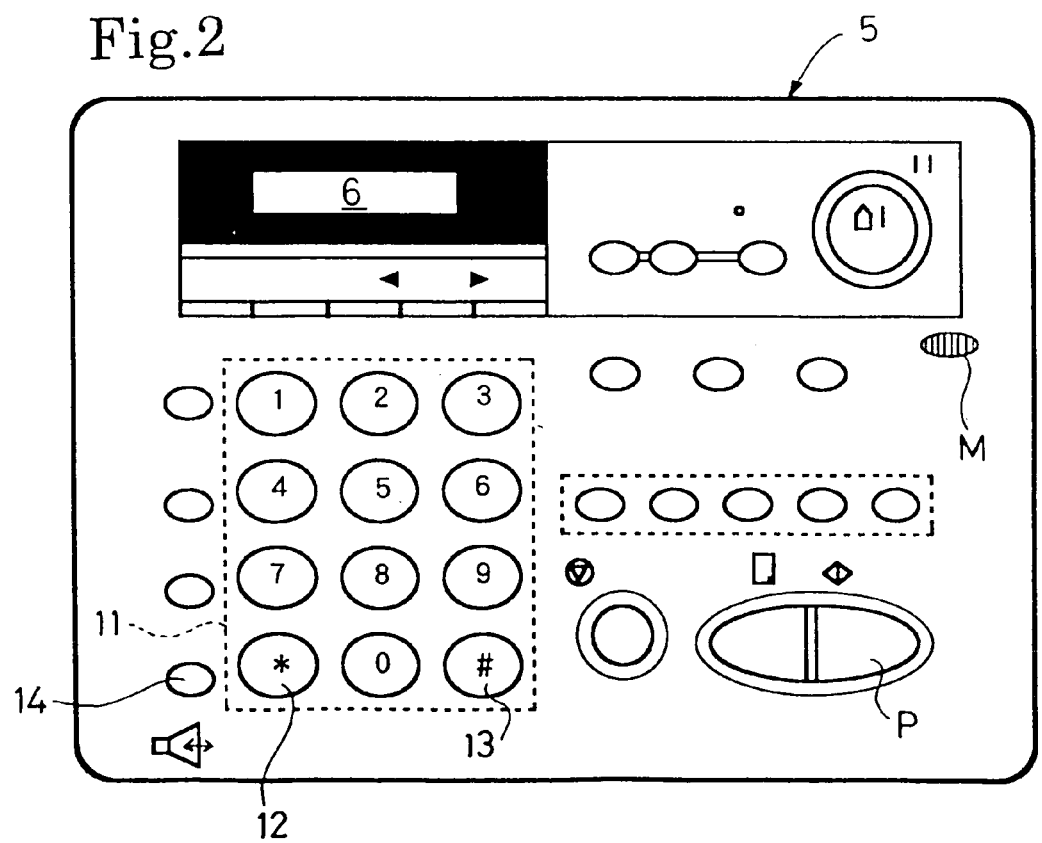
FIG. 2 is a plan view of an operating panel unit provided in the facsimile apparatus shown in FIG. 1.

The functions of various keys arranged in the operating panel unit 5 will be described with reference to FIG. 2. FIG. 2 is a plan view of the operating panel unit 5 provided in the apparatus body 2. Dial keys 11 for inputting a telephone number or the like are arranged in a left-side portion of the operating panel unit 5. The dial keys 11 include numerical keys "1" through "0", an asterisk key 12, and a pound key 13. A speaker phone key 14 is disposed to the left of a lower portion of the pad of the dial keys 11.

The particular configuration of elements in FIGS. 1 and 2 is only exemplary and not meant to be limiting in any way. The elements of FIGS. 1 and 2 may be arranged in any manner readily apparent to one of ordinary skill in the art without departing from the spirit and scope of the present invention.

Figure 3:
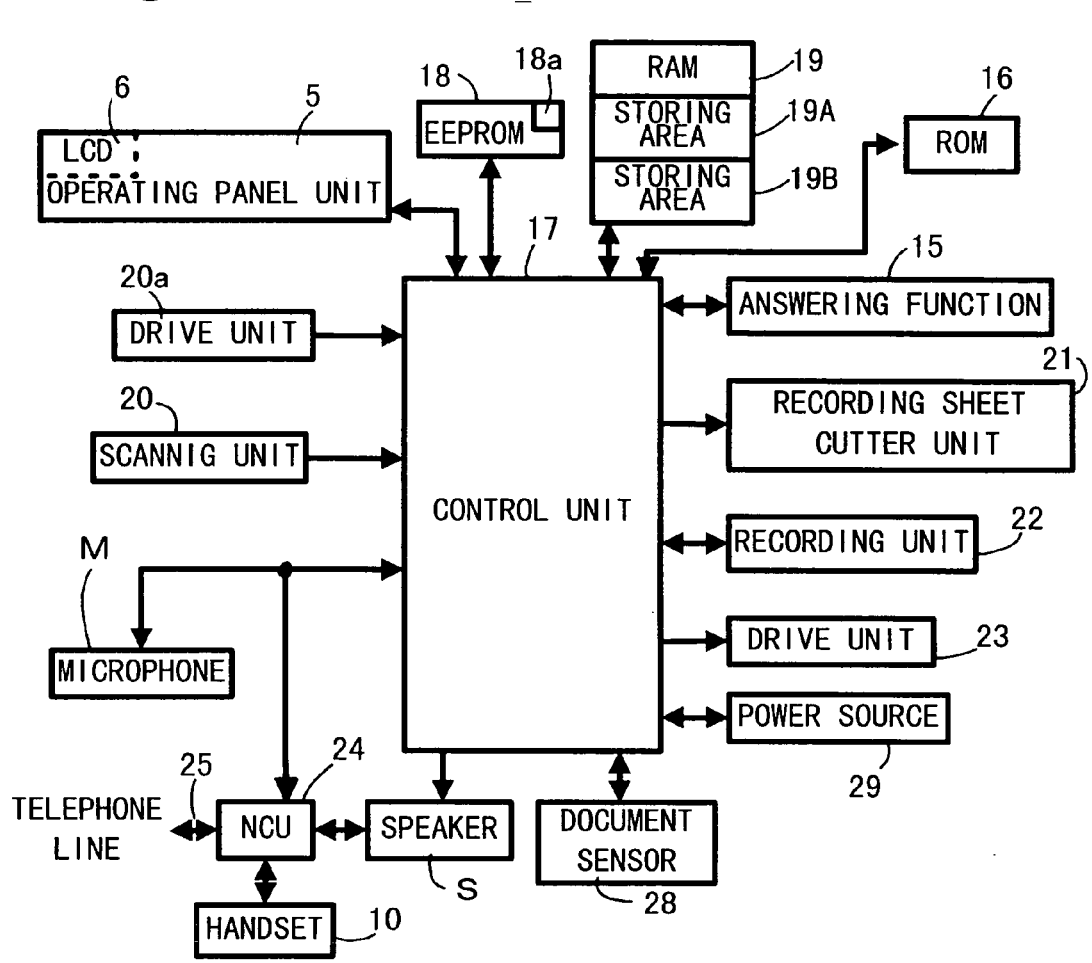
FIG. 3 is an exemplary block diagram of a control system of the facsimile apparatus.

A control system of the facsimile apparatus 1 will be described with reference to FIG. 3. FIG. 3 is a block diagram of the control system of the facsimile apparatus 1. As shown in FIG. 3, the control system of the facsimile apparatus 1 has a control unit 17 (control device) that includes a CPU as a core component. The control unit 17 is connected to a ROM 16, that is, a read-only non-volatile memory, and to an EEPROM 18, that is, a rewritable non-volatile memory, and to a RAM 19 for storing various pieces of information. The ROM 16 stores basic operation control programs for controlling a reading (or scanning) operation, a transmitting operation, a receiving operation, a recording operation and the like of the facsimile apparatus 1, and also stores parameters and the like regarding a plurality of countries that correspond to the communication standards and the like of the countries.

The ROM 16 further stores a program for selecting the parameters regarding a specified country or area or the like (geographical division) from the parameters and the like regarding the plurality of countries, areas or the like (geographical divisions) stored in the ROM 16, and a program for initializing the EEPROM 18 on the basis of the parameters read corresponding to the selected country, area or the like. More specifically, the ROM 16 stores programs illustrated by the flowcharts in FIGS. 5 through 7. As a result, the CPU operates based on the programs stored in the ROM 16.

Figure 4:
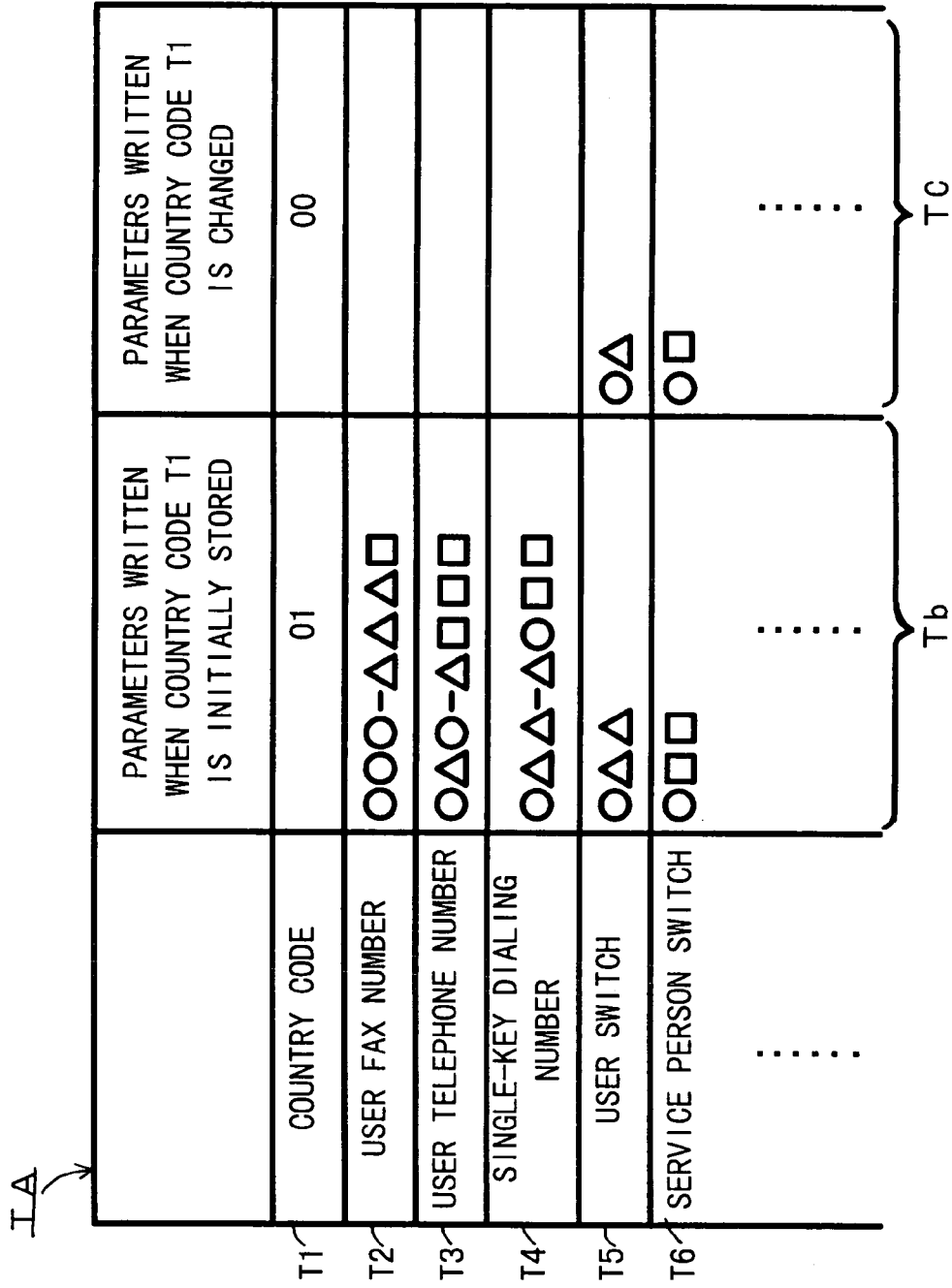
FIG. 4 shows an exemplary table stored in a memory of the facsimile apparatus.

The EEPROM 18 has a storage area 18a. When the parameters and the like regarding a country, area or the like are selected and read from the ROM 16 storing the parameters and the like regarding the plurality of countries, areas and the like, the parameters corresponding to the communication standards and the like of the selected country, area or the like are set in the storage area 18a. Such parameters can be set in the storage area 18a by, for example, using a table TA as shown in FIG. 4.

The table TA stored in the EEPROM 18 stores, for example, parameters with respect to a country or area code (hereinafter, simply referred to as "country code") T1, a user facsimile number T2, a user telephone number T3, a single-key dialing number T4, a user switch T5, a service person switch T6, and the like. Corresponding to the parameters T1–T6, the table TA has parameter storing slots Tb into which an initially selected country code T1 and parameters in relation to that country code T1 are written, and parameters storing slots Tc into which parameters are written when a country code T1 has already been stored but the country code T1 needs to be changed.

The purpose for storing parameters for the country code T1, the user facsimile number T2, the user telephone number T3, the single-key dialing number T4, the user switch T5 and the service person switch T6 into the EEPROM 18 is to keep the parameters from being erased even if a predetermined power supply to the facsimile apparatus 1 is discontinued due to, for example, a power failure or the like, after the facsimile apparatus 1 has been set.

The user switch T5 includes, for example, a switch for selecting whether to add a transmission cover sheet, and the like. The service person switch T6 includes, for example, a switch for switching between a PB signal and a DP signal for transmission to a telephone line 25, and the like.

To support the table TA stored in the EEPROM 18, the ROM 16, storing parameters regarding a plurality of countries (country A, country B, country C, . . . ), areas and the like, may store a plurality of parameter storing slots Tb for the plurality of countries (country A, country B, country C, . . . ), areas and the like. The parameters shown in FIG. 4 are merely illustrative, and parameters other than the parameters T1–T6 may also be stored.

The parameters regarding the country code T1, the user switch T5 and the service person switch T6 are geographically specific parameters, whereas the parameters regarding the user facsimile number T2, the user telephone number T3 and the single-key dialing number T4 are non-graphically specific parameters other than the geographically specific parameters. The geographically specific parameters may also include parameters other than the parameters for the country code T1, the user switch T5 and the service person switch T6. The non-graphically specific parameters other than the geographically specific parameters may also include parameters other than the parameters regarding the user facsimile number T2, the user telephone number T3 and the single-key dialing number T4.

The term "geographically specific parameters" includes parameters that need to be set specifically for each country, area or the like, for example, parameters regarding the communication standards, the communication conditions, the functions of the telephone exchanges adopted in a given country, area or the like. The values stored in the parameter storing slots Tb for the parameters T1, T5, T6 for country A, country B, country C, . . . differ from one country to another. The user switch T5 and the service person switch T6 need to be set specifically for each country, area or the like.

The non-geographically specific parameters include parameters regarding data or the like that are set specifically for a user of the facsimile apparatus 1, including parameters regarding a user facsimile number, a user telephone number, a single-key dialing number and the like. The parameters set separately for individual users mostly remain unchanged for different countries, areas and the like. It is often the case that the values stored into the parameter storing slots Tb corresponding to the parameters T2, T3, T4 are the same for country A, country B, country C and so on, and do not need to be changed once they are stored. However, these parameters may be changed if necessary.

If no geographically specific parameter has been stored in the EEPROM 18, the control unit 17 performs an initializing operation of reading the geographically specific parameters and the other parameters related to a selected country, area or the like from the ROM 16, and storing them into the EEPROM 18. The initializing operation makes the facsimile apparatus 1 usable in the selected country even though the communication standards, specifications and the like vary for one country to another. The initializing operation also makes it possible to set parameters suitable for use by each user.

If an inspector, for example, in an inspection line is to change the country code T1 which has already been stored (e.g., country code T1 of country A), to another country code T1 (e.g., of country B), the control unit 17 reads the parameters regarding the country code T1, the user switch T5 and the service person switch T6 corresponding to country B from the ROM 16, and stores them into the parameter storing slots Tc in the EEPROM 18. However, the control unit 17 does not store the parameters regarding the user facsimile number T2, the user telephone number T3 and the single-key dialing number T4, into the parameter storing slots Tc.

This manner of storing parameters is employed because, as stated above, the non-geographically specific parameters remain unchanged and therefore do not need to be rewritten if the country code T1 is changed. This storing manner reduces the time needed to store parameters. That is, if the control unit 17 reads from the ROM 16 the geographically specific parameters regarding the country code T1, the user switch T5, the service person switch T6 and the like, and the other parameters regarding, for example, the user facsimile number T2, the user telephone number T3 and the single-key dialing number T4, and stores the two types of parameters into the EEPROM 18. The quantity of parameters to be stored is large, so that a long time is needed to store all the necessary parameters into the EEPROM 18. On the other hand, if the control unit 17 stores only the newly selected geographically specific parameters (the country code T1, the user switch T5 and the service person switch T6), the quantity of parameters to be stored is small, so that the time needed to store parameters into the EEPROM 18 is reduced.

The RAM 19 is capable of temporarily storing various data calculated or processed by the CPU. The RAM 19 has a storing area 19A for storing aural information and the like, and a storing area 19B for storing image information and the like, as indicated in FIG. 3. If facsimile information is received from an external apparatus, the storing area 19B stores the received facsimile information. If facsimile information is to be transmitted from the facsimile apparatus 1 in a memory transmission mode, the storing area 19B stores the facsimile information to be transmitted. The control unit 17 is connected to an automatic answering function portion 15. If aural information is received by the automatic answering function portion 15, or if aural information is inputted via the microphone M, the aural information is converted into digital signals by the automatic answering function portion 15, and the digital aural information is stored into the storing area 19A.

The control unit 17 is connected to the operating panel unit 5 provided with the liquid crystal display (LCD) 6, a scanning unit 20 that includes a CCD unit (not shown) for reading characters, graphics and the like from a document fed from the document stacker 7 into the apparatus body 2, and a drive unit 20A for performing document conveyance control and the like while driving the CCD unit. The control unit 17 is also connected to a recording sheet cutter unit 21 for cutting a recording sheet by driving a cutter (not shown) via a cutter drive motor (not shown), a recording unit 22 that includes a print head (not shown) for printing image information received from an external apparatus onto a recording sheet, and a drive unit 23 for performing recording sheet conveyance control and the like while driving the print head. The control unit 17 is also connected to a document sensor 28 for detecting whether a document is set at a reading position.

Furthermore, the control unit 17 is connected to the telephone line 25, that is, a communication line, via a network control unit (NCU) 24. The handset 10 is connected to the NCU 24. The control unit 17 is also connected to the speaker S for outputting aural signals. The digital information stored in the storing area 19A and the like is converted into analog aural signals by the automatic answering function portion 15. Supplied with the analog aural signals from the automatic answering function portion 15, the speaker S outputs aural signals. The control unit 17 is connected to a power source 29.

For normal facsimile transmission from the facsimile apparatus 1 constructed as described above, a user sets a document to be read in the document stacker 7, and inputs a receiver facsimile number by operating dial keys 11, and then presses the start key P. In response, the document is fed into the facsimile apparatus 1. Under control by the control unit 17, the scanning unit 20 reads image data from the document while the drive unit 20A is operating to convey the document. After compressing and modulating the image data, the control unit 17 transmits the compressed and modulated image data to the receiver apparatus via the NCU 24 and the telephone line 25.

If the facsimile apparatus 1 receives compressed and modulated image data from an external apparatus via the telephone line 25 and the NCU 24, the control unit 17 demodulates and restores the image data. Under drive control by the control unit 17, the recording unit 22 including the print head and the drive unit 23 operate to print the image data on a recording sheet provided in the apparatus body 2. After the printing operation, the control unit 17 drives the recording sheet cutter unit 21 to cut off a printed portion of the recording sheet. The reception operation is thus completed.

For a copy operation in which the recording unit 22 records image information inputted by the scanning unit 20, the control unit 17 operates as follows. When a document to be scanned (copied) is fed into the apparatus body 2, the scanning unit 20 reads image data from the document while the drive unit 20A is operating to convey the document, under control by the control unit 17. The read image data is immediately supplied to the recording unit 22, so that the print head of the recording unit 22 and the drive unit 23 operate to print the image data onto a recording sheet provided in the apparatus body 2. After the printing operation, the control unit 17 drives the recording sheet cutter unit 21 to cut off a printed portion of the recording sheet. The copy operation is thus completed.

Figure 5:
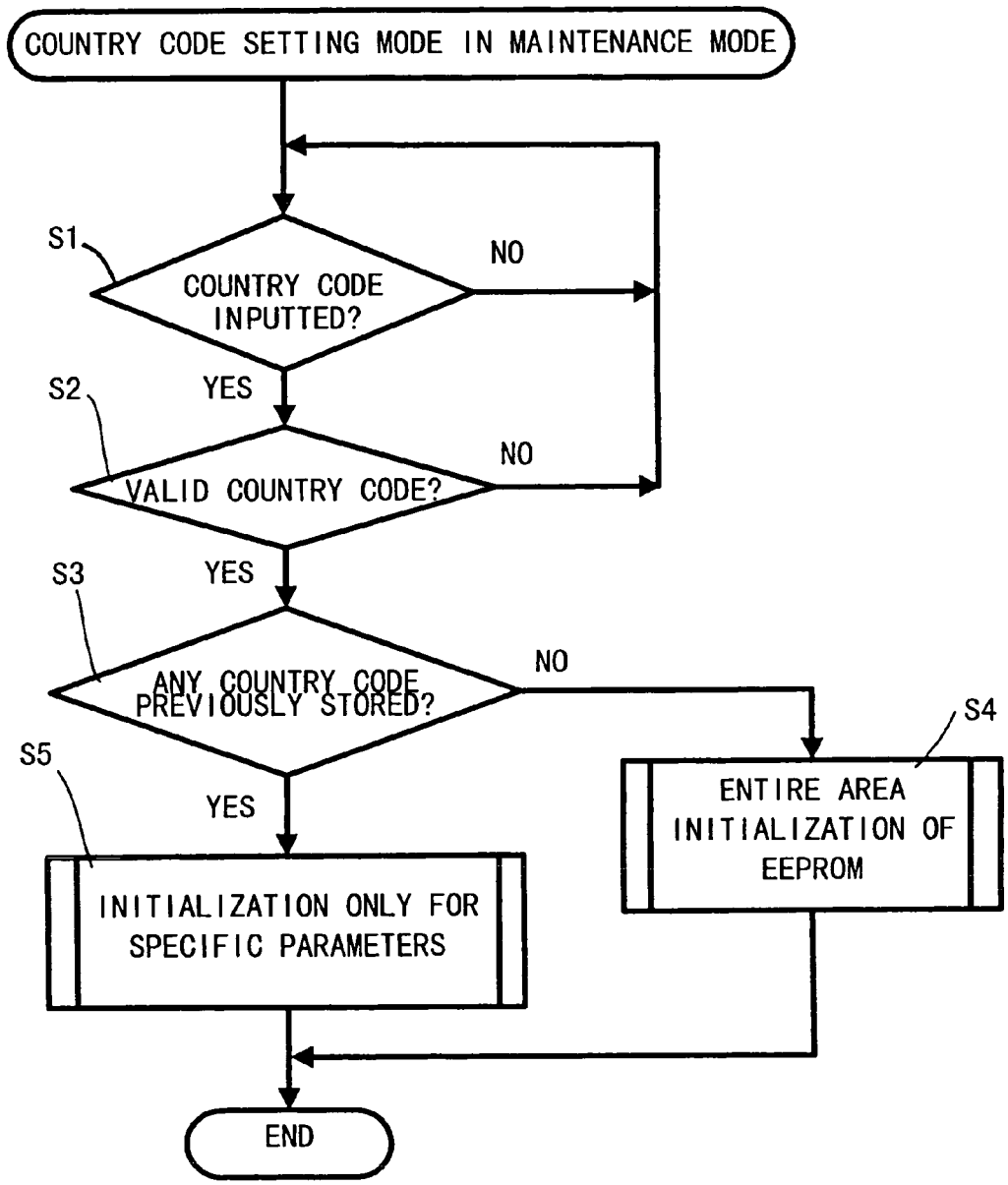
FIG. 5 is a flowchart outlining an exemplary procedure of a control operation performed during a part of the period of a maintenance mode of the facsimile apparatus.
Figure 6:
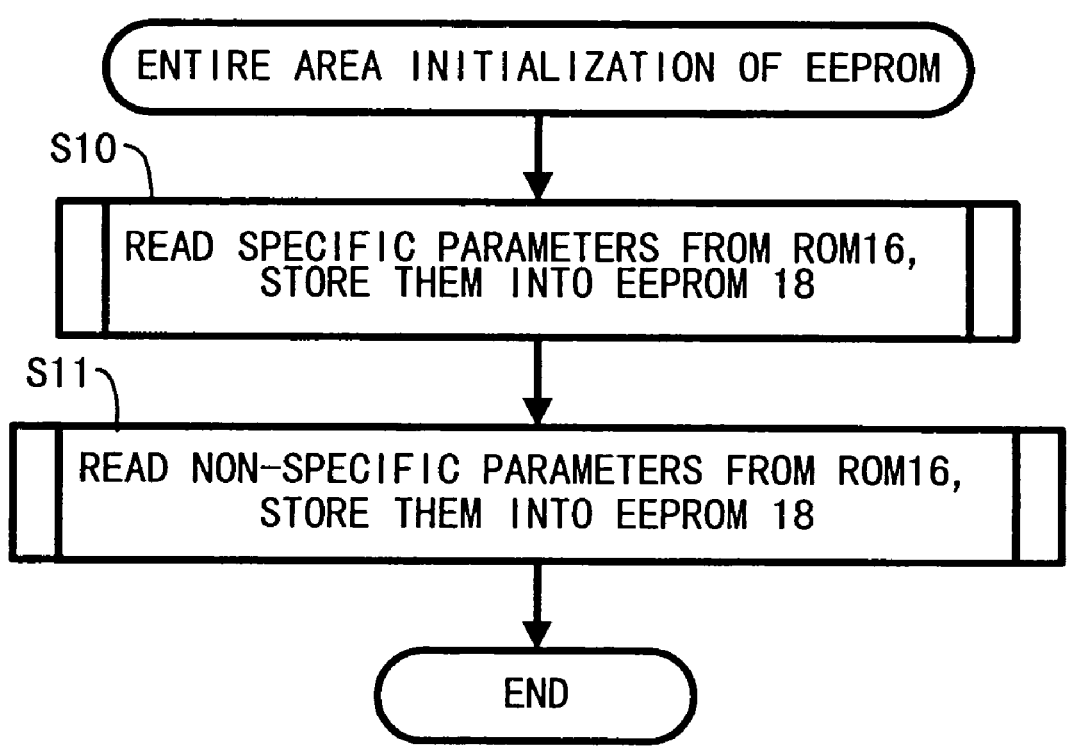
FIG. 6 is a flowchart outlining a portion of the exemplary procedure of the control operation illustrated in FIG. 5.
Figure 7:
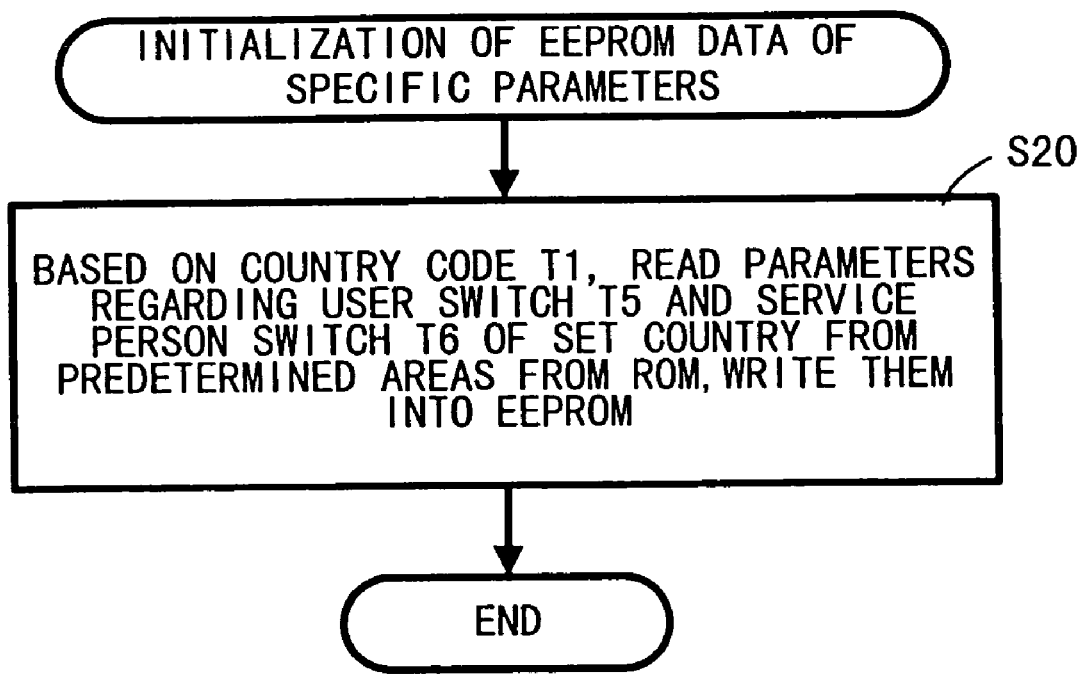
FIG. 7 is a flowchart outlining another portion of the exemplary procedure of the control operation illustrated in FIG. 5.

The procedure of a control operation performed in a maintenance mode of the facsimile apparatus 1 will be described with reference to FIGS. 5 through 7. FIG. 5 is a flowchart outlining an exemplary procedure of a control operation performed during a portion of the period of the maintenance mode. FIGS. 6 and 7 are flowcharts outlining portions of the control operation illustrated in FIG. 5.

After being produced, the facsimile apparatus 1 is put into an inspection line. In the maintenance mode, various aspects are inspected to see whether the facsimile apparatus 1 is normal. For example, the recording system including the recording unit 22, the scanning system including the scanning unit 20, the communication system including the NCU 24, and various other components are inspected. In an early stage of the inspection, the EEPROM 18 is initialized.

During the initialization of the EEPROM 18, the control unit 17 determines in step S1 in FIG. 5 whether a country code T1 has been inputted. At an inspection line, for example, an inspector may input a country code T1 into the facsimile apparatus 1 by operating dial keys 11 of the operating panel unit 5. Therefore, the control unit 17 checks whether a country code T1 has been inputted. For example, if the facsimile apparatus 1 is to be exported to country A, the inspector may input the country code T1 of country A, for example, "01". If the facsimile apparatus 1 is to be exported to country B or C, the country code T1 of country B or C, for example, "00" or "09", may be input.

The control unit 17 monitors the key operation status of the dial keys 11. If the control unit 17 detects no key input, that is, determines that no country code T1 has been input (NO in step S1), the control unit 17 waits until a key input is made.

If the control unit 17 detects a key input (YES in step S1), the control unit 17 determines in step S2 whether the input is a valid country code T1. If it is not a valid country code T1 (NO in step S2), the control unit 17 returns to step S1.

For example, if the inspector mistakenly inputs "11" as a country code T1 into the facsimile apparatus 1 to be exported to country A, instead of the country code T1 "01" of country A, the control unit 17 determines in step S2 that the input is not a valid country code T1, and returns to step S1. Thus, the control unit 17 prevents the proceeding of operation based on a false country code input by the inspector.

If the key input of "01" for country A has been made (YES in step S2), the control unit 17 determines in step S3 whether there is a country code T1 stored previously. More specifically, the control unit 17 checks whether any one of the country codes T1, for example, "01", "00" or "09", has been stored in the parameter storing slot Tb for the country code T1 in the table TA.

If there is no country code T1 stored in the table TA (NO in step S3), the control unit 17 performs entire area initialization of the EEPROM 18 in step S4. Conversely, if there is a country code T1 stored previously, the control unit 17 performs initialization with respect to only the geographically specific parameters, that is, writes only the geographically specific parameters read from the ROM 16, into the EEPROM 18, in step S5.

More specifically, the control unit 17 performs the entire area initialization of the EEPROM 18 by performing an operation such as outlined in the flowchart shown in FIG. 6, for example. In step S10, the control unit 17 reads the geographically specific parameters regarding an initially selected country, area or the like from the ROM 16, and stores the parameters into the EEPROM 18. That is, the control unit 17 reads the geographically specific parameters regarding the country code T1, the user facsimile number T2, the service person switch T6 and the like from the ROM 16, and stores them into the EEPROM 18.

Subsequently in step S11, the control unit 17 reads the non-geographically specific parameters from the ROM 16, and stores them into the EEPROM 18. That is, the control unit 17 reads the parameters regarding the user facsimile number T2, the user telephone number T3, the single-key dialing number T4 and the like from the ROM 16, and stores them into the EEPROM 18. The control unit 17 thus completes storing the parameters into the parameter storing slots Tb corresponding to the items T1 through T6 shown in FIG. 4.

Although in this embodiment, the parameters are stored into the EEPROM 18 in two steps, that is, steps S10 and S11, it is also possible to store the parameters into the EEPROM 18 in a single step.

To perform the initialization with respect to only the geographically specific parameters, the control unit 17 performs an operation such as outlined in the flowchart shown in FIG. 7, for example. In step S20, the control unit 17 reads the parameters regarding the user switch T5, the service person switch T6 and the like from predetermined areas in the ROM 16, and stores them into the EEPROM 18. The control unit 17 thus completes storing the parameters into parameter storing slots Tc corresponding to the user switch T5, the service person switch T6 and the like, as well as the country code T1, as shown in FIG. 4.

If the parameter storing slots Tb have already stored parameters but the geographically specific parameters need to be changed at an inspection line by an inspector or the like, only the parameter storing slots Tc for the country code T1, the user switch T5, the service person switch T6 and the like are initialized, that is, parameters are written into only those parameter storing slots Tc. Therefore, the time required for the initialization with respect to the geographically specific parameters, that is, the time required for changes related to the parameter storing slots Tc, is shorter than the time required for the entire area initialization of the EEPROM 18, so that the total production cost can be reduced.

If the designated importing country of the facsimile apparatus 1 is changed after the apparatus 1 has been output from the production line, it is only required that an inspector or the like make changes in relation to the parameter storing slots Tc. Thus, such an importing country change can be easily and flexibly performed. In this embodiment, the initialization performed by the control unit 17 means that the control unit 17 reads a parameter from the ROM 16 and stores it into the EEPROM 18. However, a different method may also be employed according to the invention.

As is apparent from the above description, the facsimile apparatus 1 of this embodiment includes a non-volatile memory device for storing various parameters, and the control unit 17 (control device) for performing operations based on the parameters and the like. The non-volatile memory device includes the ROM 16 (read-only non-volatile memory) storing parameters and the like regarding a plurality of countries, areas or the like (i.e., geographical divisions), and the EEPROM 18 (rewritable non-volatile memory) capable of storing at least the aforementioned parameters and the like. When a certain country, area or the like is selected, the control unit 17 (control device) initializes the EEPROM 18 on the basis of the parameters regarding the selected country, area or the like, read from the ROM 16.

That is, when a certain country, area or the like, is selected, the control unit 17 reads the parameters regarding the selected country, area or the like, from the ROM 16 and then stores the read parameters into the EEPROM 18. Therefore, once a certain country, area or the like, is selected, an inspector, for example, does not need to select various parameters related to the selected country, area or the like, so that the necessary parameters can be easily and reliably selected and stored.

It is to be understood that the invention is not restricted to the particular forms shown in the foregoing embodiment. Various modifications and alternations can be made thereto without departing from the scope of the invention. For example, the communication terminal apparatus of the invention does not need to be a facsimile apparatus, but may also be applied to home electric appliances including television sets or the like, information appliances including telephone apparatuses, computers and the like, and various other communication apparatuses including a multi-function device incorporating a facsimile transmitter-receiver function, a copier function, an automatic answering telephone function, and the like. The non-volatile memory is not limited to an EEPROM that allows rewriting in the unit of bytes, but may also be, for example, a flush-type EEPROM, or the like.

The method of selecting a certain country, area or the like is not limited to a key input method, but may also be, for example, an input method using bar codes indicating countries, areas or the like, a method in which a DTMF signal indicating a certain country, area or the like is inputted from an external device. Furthermore, the selection of certain country, area, or the like, may be performed using a pointing device, touch panel display, voice recognition, and the like.

It is preferable that a user be allowed to rewrite the parameters stored in the EEPROM 18 including the parameter regarding a country or area code. Although apparatuses are produced in accordance with the communication standards, specifications and the like of their designated importing countries, and correspondingly exported, there are cases where a user in an area near a country border finds that adoption of the communication standards, specifications and the like of the neighboring country is more suitable to maximize the communication performance of the apparatus than adoption of the communication standards, specifications and the like of the user's country. Furthermore, a user may move to a foreign country. Therefore, it is preferable to provide an input device in the communication terminal apparatus for rewriting the content of the EEPROM 18, for example, a key or the like (not shown) dedicated for such a rewriting operation.

A second embodiment in which the invention is applied to a facsimile apparatus will be described with reference to FIGS. 8 through 12. The overall construction of the facsimile apparatus according to the second embodiment will be described with reference to FIG. 8, which is an external perspective view of the facsimile apparatus.

Figure 8:
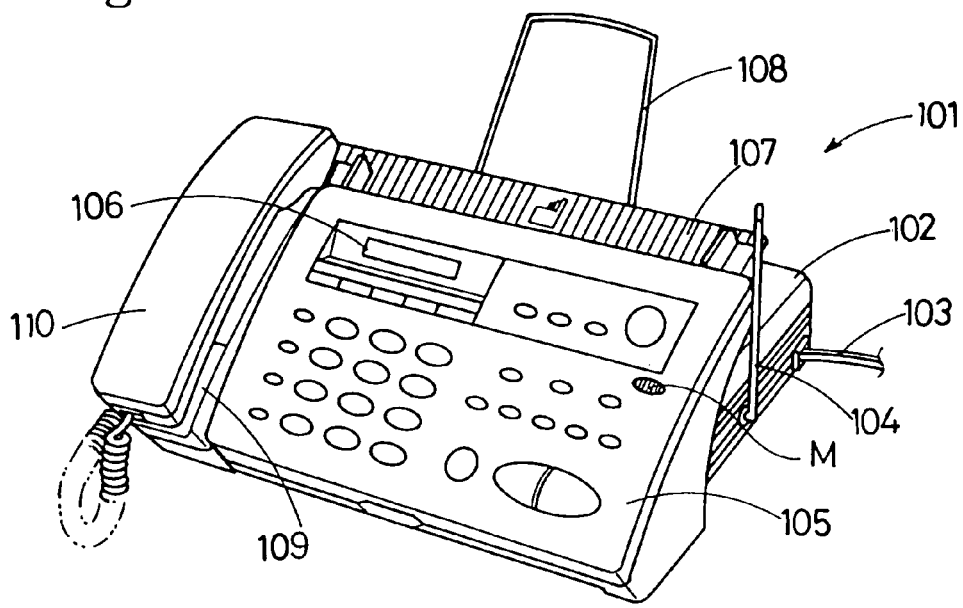
FIG. 8 is an external perspective view of a facsimile apparatus according to a second embodiment of the invention.

Referring to FIG. 8, the facsimile apparatus 101 has an apparatus body 102. Connected to a right-side face of the apparatus body 102 are a power supply cord 103 and an antenna 104 for communication with a child apparatus (not shown). Provided in an upper face of the apparatus body 102 is an operating panel unit 105 in which a display 106, such as a liquid crystal display (LCD) or the like, and a microphone M are disposed. The microphone M picks up user voices when the mode is switched to a speaker phone mode by using a speaker phone key 114. In the speaker phone mode, a telephone conversation via a handset 110 is switched to a telephone conversation via the microphone M and a speaker 126 (see FIG. 10) so that a user can have a telephone conversation without holding up the handset 110. Various keys are arranged in the operating panel unit 105. The keys will be described in detail later.

Disposed rear of the operating panel unit 105 is a document stacker 107 for setting a document or a stack of documents to be scanned. A sheet support 108 is disposed rearward of the document stacker 107. Disposed in a left-side portion of the apparatus body 102 is a handset base portion 109 on which the handset 110 is placed.

Figure 9:
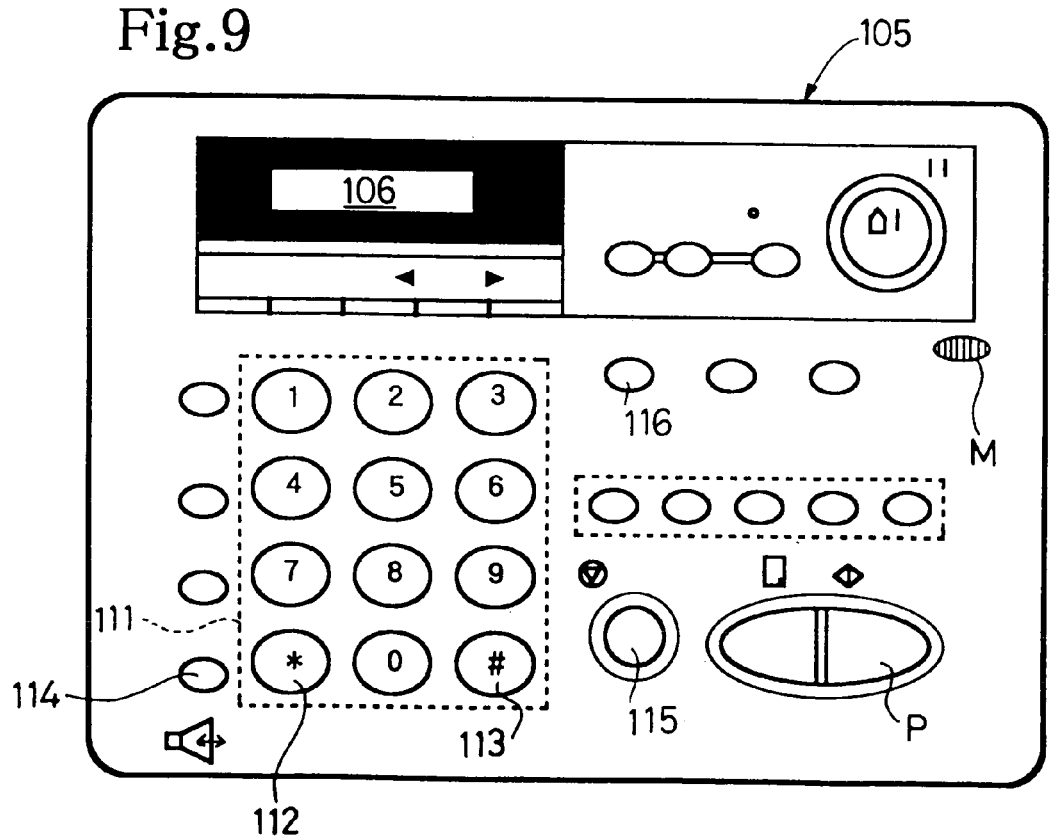
FIG. 9 is a plan view of an operating panel unit of the facsimile apparatus shown in FIG. 8.

The functions of the various keys arranged in the operating panel unit 105 will be described with reference to FIG. 9. FIG. 9 is a plan view of the operating panel unit 105. Dial keys 111 for inputting a telephone number or the like are arranged in a left-side portion of the operating panel unit 105. The dial keys 111 include numerical keys "1" through "0", an asterisk key 112, and a pound key 113. The speaker phone key 114 is disposed to the left of a lower portion of the pad of the dial keys 111. The speaker phone key 114 is provided for setting the speaker phone mode, that is, switching to a telephone conversation via the microphone M and the speaker 126. A function button 116 and the like for selecting various functions are disposed to the right of the dial keys 111 in the operating panel unit 105. Disposed in a lower right portion of the operating panel unit 105 are various keys necessary to operate the facsimile apparatus 101, including a start key P for starting facsimile transmission, and a stop button 115 for stopping facsimile transmission or the like.

The particular configuration of elements in FIGS. 8 and 9 is only exemplary and not meant to be limiting in any way. The elements of FIGS. 8 and 9 may be arranged in any manner readily apparent to one of ordinary skill in the art without departing from the spirit and scope of the present invention.

Figure 10:
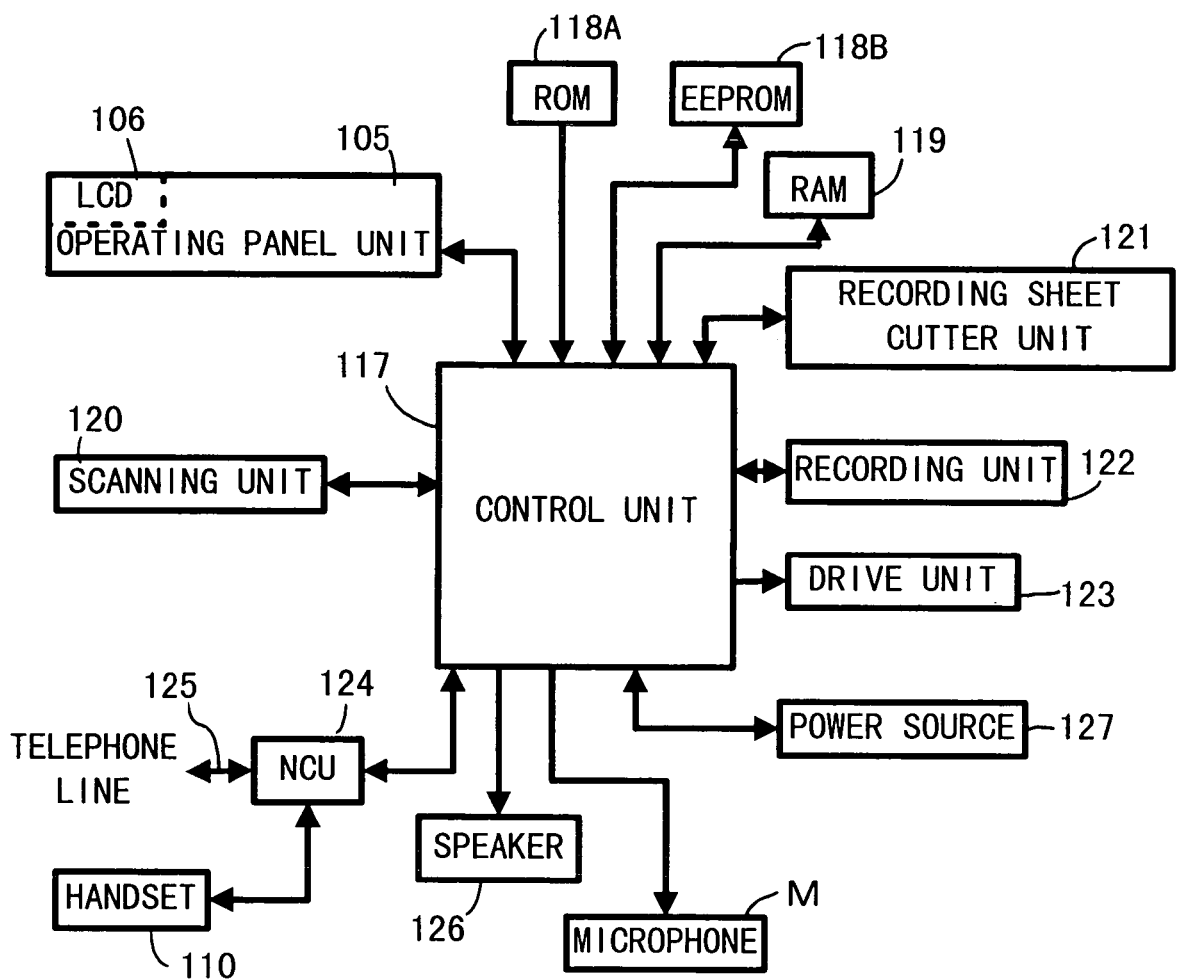
FIG. 10 is an exemplary block diagram of a control system of the facsimile apparatus.

A control system of the facsimile apparatus 101 will be described with reference to FIG. 10. FIG. 10 is a block diagram of the control system of the facsimile apparatus 101 of the second embodiment. As shown in FIG. 10, the control system of the facsimile apparatus 101 has a control unit 117 (control device) that includes a CPU as a core component. The control unit 117 is connected to a ROM 118A, that is, a read-only non-volatile memory, and to an EEPROM 118B, that is, a rewritable non-volatile memory, and to a RAM 119. The ROM 118A stores basic operation control programs for controlling a reading (or scanning) operation, a transmitting operation, a receiving operation, a recording operation and the like of the facsimile apparatus 101, and also stores parameters and the like regarding a plurality of countries, areas and the like that correspond to the communication standards and the like of the countries. The ROM 118A further stores a program for selecting the parameters regarding a specified country or area or the like (geographical division) from the parameters and the like regarding the plurality of countries, areas or the like (geographical divisions), and a program (illustrated in FIG. 12) for storing the parameters read corresponding to the selected country, area or the like, into the EEPROM 118B. The EEPROM 118B stores the parameters and the like regarding the selected country, area or the like, a country selection flag, and the like. The RAM 119 is provided for temporarily storing various data calculated or processed by the CPU, and aural data, image data and the like that are received via a communication link, such as a telephone line or the like.

The control unit 117 is connected to the operating panel unit 105 provided with the display 106, and to a scanning unit 120 including a reading scanner for reading characters, graphics and the like, from a document fed from the document stacker 107 into the apparatus body 102. The control unit 117 is also connected to a recording sheet cutter unit 121 for cutting a recording sheet by driving a cutter via a cutter drive motor, and to a recording unit 122 that includes a print head for printing image data received from an external apparatus via the telephone line onto a recording sheet, and to a drive unit 123 that includes a drive mechanism for driving the print head, a recording sheet conveying mechanism for performing recording sheet conveyance control, and the like.

Furthermore, the control unit 117 is connected to the telephone line 125, via a network control unit (NCU) 124. The handset 110 is also connected to the NCU 124. The control unit 117 is also connected to the speaker 126, the microphone M, and a power source 127. The speaker 126 outputs voices of a communication partner during the speaker phone mode. The speaker 126 is also used to play back voice/sound data temporarily stored in the RAM 119.

The dial keys 111 and the like, form a selector device that selects a specification, such as a parameter, from specifications corresponding to the communication standards and the like of various countries, by inputting a selection number or the like for selecting a country. The ROM 118A forms a first specification storing device that stores a plurality of specifications. The EEPROM 118B forms a second specification storing device that stores a selected specification. The control unit 117, having the CPU as a core component, forms a determining device that determines whether the specification selected by the selector device is a predetermined specification, and a control device that performs a control to start the main program if the selected specification is the predetermined specification. The display 106 forms an output device that displays a selected parameter stored in the EEPROM 118B.

For facsimile transmission from the facsimile apparatus 101 constructed as described above, a user sets a document to be read into the document stacker 107, and inputs a receiver facsimile number by operating dial keys 111, and then presses the start key P. In response, the document is fed in, and image data is read from the document by the scanning unit 120. In accordance with the parameters stored in the EEPROM 118B, such as the communication standards and the like, image data is modulated and coded, and then transmitted to the receiver apparatus via the NCU 124 and the telephone line 125. If image data is received via the telephone line 125 and the NCU 124, the control unit 117 demodulates and decodes the image data for re-development in accordance with the parameters stored in the EEPROM 118B, such as the communication standards and the like, and then stores the data into the RAM 119. Subsequently, the control unit 117 drives the recording unit 122 including the print head and the drive unit 123 to print the image data onto a recording sheet. After the printing operation, the control unit 117 drives the recording sheet cutter unit 121 to cut off a printed portion of the recording sheet.

Figure 11:
FIG. 11 shows an exemplary data table regarding the dial and busy tones of a plurality of countries stored in a memory provided in the facsimile apparatus.

Among the parameters of the specifications regarding a plurality of countries stored in the ROM 118A, an example of parameters regarding communication will be described with reference to FIG. 11. FIG. 11 shows a data table regarding the dial and busy tones of a plurality of countries stored in the ROM 118A of the facsimile apparatus 101 of this embodiment.

The ROM 118A stores various parameters of specifications of three countries, that is, Belgium, Italy and Sweden. Among the parameters stored in the ROM 118A, the parameters regarding the dial and busy tones employed in the communication in each country are shown in a data table 130 in FIG. 11.

As shown in FIG. 11, the data table 130 includes the items of "COUNTRY", and "DETECTION", "FREQUENCY (Hz)" and "PATTERN (sec.)" for dial tones, and "DETECTION", "FREQUENCY (Hz)" and "PATTERN (sec.)" for busy tones. With regard to Belgium, "DETECTION", "FREQUENCY (Hz)" and "PATTERN (sec.)" for the dial tone are defined as "YES (that is, detection is performed)", "450 Hz" and "CONTINUOUS PATTERN", respectively, and "DETECTION", "FREQUENCY (Hz)" and "PATTERN (sec.)" for the busy tone are defined as "YES", "450 Hz" and "0.5 SEC. ON-0.5 SEC. OFF PATTERN", respectively. With regard to Italy, "DETECTION", "FREQUENCY (Hz)" and "PATTERN (sec.)" for the dial tone are defined as "YES", "425 Hz" and "0.6 SEC. ON-1.0 SEC. OFF TO 0.2 SEC. ON-0.2 SEC. OFF PATTERN", and "DETECTION", "FREQUENCY (Hz)" and "PATTERN (sec.)" for the busy tone are defined as "NO (that is, detection is not performed)", "425 Hz" and "0.2 SEC. ON-0.2 SEC. OFF PATTERN". With regard to Sweden, "DETECTION", "FREQUENCY (Hz)" and "PATTERN (sec.)" for the dial tone are defined as "YES", "425 Hz" and "CONTINUOUS PATTERN", and "DETECTION", "FREQUENCY (Hz)" and "PATTERN (sec.)" for the busy tone are defined as "YES", "425 Hz" and "0.25 SEC. ON-0.25 SEC. OFF PATTERN".

In this manner, the parameters regarding the dial and busy tones employed for the communication in each of the three countries, that is, Belgium, Italy and Sweden, are pre-stored in the ROM 118A. The parameters regarding one of the countries are selected, and stored into the EEPROM 118B as described later.

Figure 12:
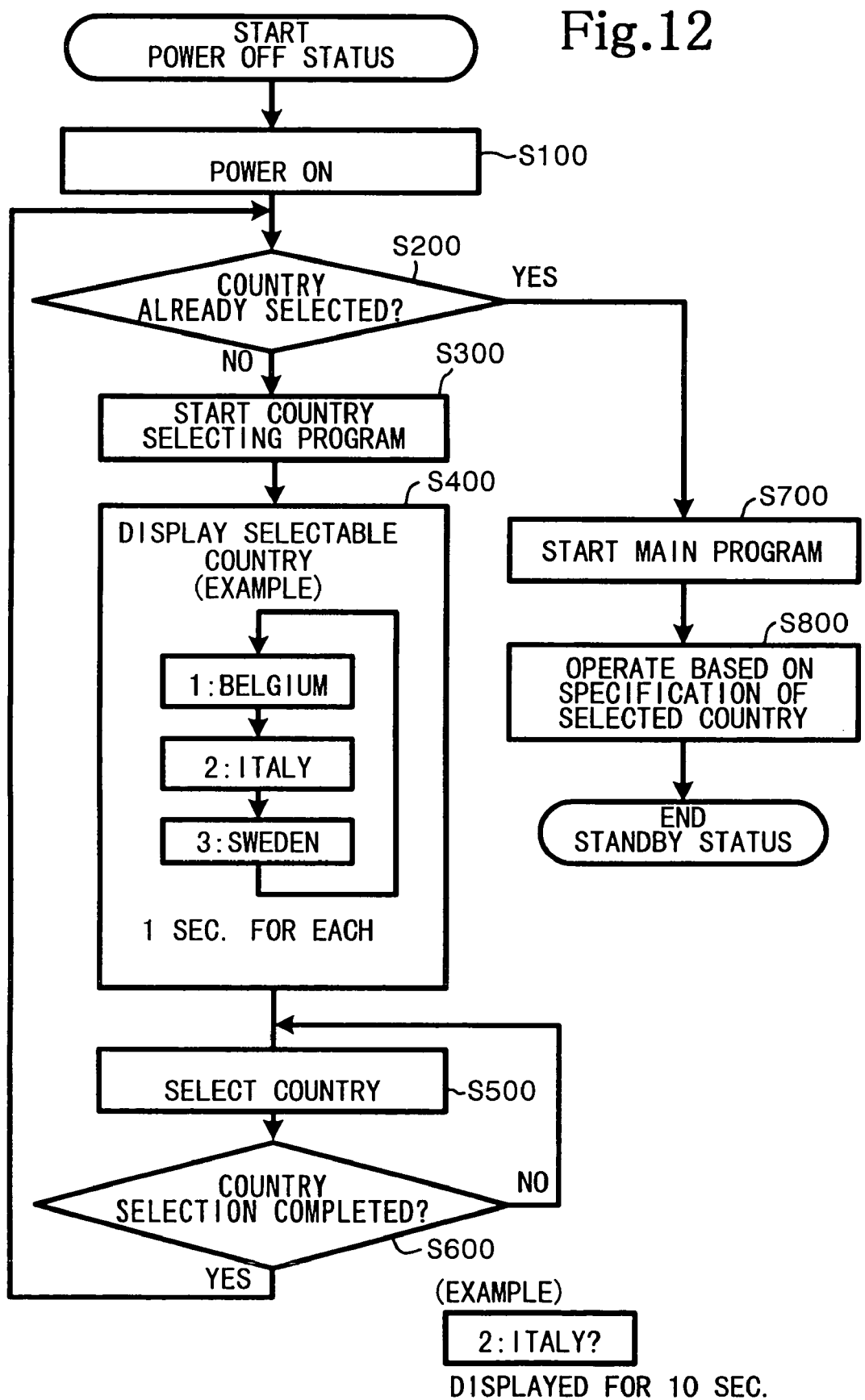
FIG. 12 is a flowchart outlining an exemplary control operation performed for selecting the specification of a designated importing country in a production line of the facsimile apparatus.

The procedure of a control operation performed in a production line for selecting the parameters of the specification regarding one of the three countries from the parameters regarding the three countries pre-stored in the ROM 118A of the facsimile apparatus 101, and storing the selected parameters into the EEPROM 118B, and then starting the main program, will be described with reference to FIG. 12. FIG. 12 is a flowchart outlining an exemplary control operation of selecting the specification of an importing country of the facsimile apparatus 101 in a production line thereof, according to this embodiment.

In step S100 in FIG. 12, the facsimile apparatus 101 assembled in an assembly line of the production line is powered on in an adjustment line of the production line in order to perform various adjustments. When powered on, the facsimile apparatus 101 (the control unit 117) first reads a country selection flag from the EEPROM 118B, and resets the flag, and then re-stores it into the EEPROM 118B, in accordance with a starting program stored in the EEPROM 118B.

Subsequently in step S200, it is determined whether the country selection flag has been set in the EEPROM 118B. If the country selection flag has not been set (NO in step S200), that is, if the specification of a designated importing country has not been selected nor stored into the EEPROM 118B, the operation proceeds to step S300. In step S300, a country selecting program for selecting the specification of the importing country and storing it into the EEPROM 118B is read from the ROM 118A, so that the country selecting operation is started.

Subsequently in step S400, the control unit 117 causes the display 106 to sequentially display the country names pre-stored in the ROM 118A together with their selection numbers for a predetermined time period for each country name in repeated cycles (about 1 second for each country name at a time in this embodiment). That is, the display 106 displays the country names in the order of, for example, "1: BELGIUM", "2: ITALY", "3: SWEDEN", "1: BELGIUM", . . . , where the selection numbers for Belgium, Italy and Sweden are "1", "2" and "3", respectively.

Subsequently in step S500, if an operating person at the adjustment line presses a numerical key of the dial keys 111 corresponding to the selection number of the designated importing country, the control unit 117 reads the specification of the country corresponding to the input selection number from the ROM 118A, and stores the specification into the EEPROM 118B.

Subsequently in step S600, the control unit 117 causes the display 106 to display the country name corresponding to the input selection number together with the selection number for a predetermined time, such as about 10 seconds, to inquire of the operating person at the adjustment line whether the operating person needs to correct the selection. For example, if the numerical key "2" has been pressed, the display 106 displays "2: Italy ?". Therefore, in step S600, the control unit 117 can determine whether country selection has been completed.

If any one of the numerical keys corresponding to the other selection numbers is pressed within the predetermined time following the start of display of the selection number and the country name inputted by the operating person, the control unit 117 determines that a new selection number has been inputted (NO in step S600). In this case, the control unit 117 returns to step S500.

Conversely, if none of the numerical keys corresponding to the other selection numbers is pressed within the predetermined time following the start of display of the selection number and the country name, the control unit 117 determines that the specification corresponding to the designated importing country has been selected (YES in step S600). Subsequently, the control unit 117 reads the country selection flag from the EEPROM 118B, and sets the flag, and then stores it back into the EEPROM 118B. Then, the operation returns to step S200.

If it is determined in step S200 that the country selection flag has been set in the EEPROM 118B (YES in step S200), the operation goes to step S700, in which the control unit 117 reads the main program from the ROM 118A, and starts executing the main program.

Subsequently in step S800, the main program is operated on the basis of the specification of the selected country stored in the EEPROM 118B (for example, the specification of Italy). That is, the facsimile apparatus 101 now operates on the basis of the specification of the designated importing country.

As is apparent from the foregoing description, when the facsimile apparatus 101 of this embodiment is powered on (step S100) in the adjustment line of the production line after the apparatus has been assembled in the assembly line, the control unit 117 executes the country selecting program for reading from the ROM 118A the specification of an importing country selected by an operating person, and storing the specification into the EEPROM 118B. After the specification of the designated importing country has been read from the ROM 118A and stored into the EEPROM 118B (steps S200–S600), the control unit 117 starts the main program (step S700). Then the facsimile apparatus 101 operates on the basis of the specification stored in the EEPROM 118B (step S800).

Since the program for selecting the specification of a designated importing country from the specifications of a plurality of countries stored in the ROM 118A is automatically started when the facsimile apparatus 101 assembled in the production line is powered on, the facsimile apparatus 101 reliably prevents a failure to set the specification of the designated importing country, thereby allowing an improvement in the product quality.

Furthermore, since the main program is started on the basis of the specification that has been read from the ROM 118A and stored into the EEPROM 1181B, the facsimile apparatus 101 reliably prevents the main program from starting on the basis of a false specification that is incorrectly inputted. Further, since the main program cannot be started until a predetermined specification is stored into the EEPROM 118B, the facsimile apparatus 101 reliably prevents a failure to select the predetermined specification.

Since the display 106 displays the name of a country selected by an operating person or the like in the operation of selecting a predetermined specification from the specifications stored in the ROM 118A and then storing it into the EEPROM 118B, it becomes possible to reliably prevent an error in selecting the predetermined specification.

If a false specification is selected and stored into the EEPROM 118B during an operation for selecting the specification of a designated importing country from the specifications stored in the ROM 118A, the EEPROM 118B can be initialized, so that it becomes possible to read the predetermined specification from the ROM 118A and store it into the EEPROM 118B. Therefore, the quality of the communication terminal apparatus can be improved.

As described above, the communication terminal apparatus of the invention prevents the main program from starting before the specification of a designated importing country is selected from the pre-stored specifications of a plurality of countries and the specification is set. Therefore, the communication terminal apparatus does not operate on the basis of a false specification that is incorrectly inputted. Consequently, the invention makes it possible to prevent a failure to set a predetermined specification and an error in setting the specification, and allows an improvement in the product quality.

The initialization and selection of geographically specific parameters and non-geographically specific parameters is not limited to being performed by an inspector on an inspection line. Rather, the initialization and selection of parameters may be performed at any time during or after manufacture of the communication terminal apparatus.

It is to be understood that the invention is not restricted to the particular forms shown in the foregoing embodiments. Various modifications and alternations can be made thereto without departing from the scope of the invention.

What is claimed is:

1. A communication terminal apparatus comprising:
   a first memory that stores parameters for each of a plurality of geographical divisions and at least one operation-control program;
   a second memory;
   an input device that allows an operator to select a geographical division; and
   a control device that customizes the second memory on the basis of parameters for a selected geographical division selected by the operator, the parameters for the selected geographical division being read from the first memory, wherein:
   the parameters for each of the plurality of geographical divisions include at least one geographical division-specific parameter and at least one non-geographical division-specific parameter for each of the plurality of geographical divisions,
   if no geographical division-specific parameter has been stored in the second memory, the control device reads at least one geographical division-specific parameter regarding the selected geographical division and at least one non-geographical division-specific parameter regarding the selected geographical division, from the first memory, and stores the at least one geographical division-specific parameter and the at least one non-geographical division-specific parameter into the second memory, and
   if at least one geographical division-specific parameter regarding a first geographical division has already been stored in the second memory and a second geographical division is selected, the control device only reads at least one geographical division-specific parameter regarding the selected second geographical division from the first memory, and stores the at least one geographical division-specific parameter into the second memory.

2. The communication terminal apparatus according to claim 1, wherein the input device allows the user to rewrite parameters stored in the second memory, the parameters including a geographical division code.

3. The communication terminal apparatus according to claim 1, wherein the first memory is a read-only non-volatile memory and the second memory is a rewritable non-volatile memory.

4. The communication terminal apparatus according to claim 1, wherein the at least one geographical division-specific parameter is a parameter regarding communication standards adopted in a geographical division.

5. A communication terminal apparatus comprising:

a first specification storing device into which a plurality of specifications and at least one operation-control program are pre-stored;

a selector device that allows an operator to select a selected specification from the first specification storing device;

a second specification storing device that stores the specification selected by the operator using the selector device;

a determining device that determines whether the specification stored in the second specification storing device is a predetermined specification; and a control device that performs a control such that a main program starts, if the determining device determines that the specification stored in the second specification storing device is the predetermined specification, wherein:

the specifications includes parameters for each of a plurality of geographical divisions, the parameters include at least one geographical division-specific parameter and at least one non-geo graphical division-specific parameter for each of the plurality of geographical divisions, if no geographical division-specific parameter has been stored in the second specification storing device, the control device reads at least one geographical division-specific parameter regarding the selected geographical division and at least one non-geographical division-specific parameter regarding the selected geographical division from the first specification storing device, and stores the at least one geographical division-specific parameter and the at least one non-geographical division-specific parameter into the second specification storing device, and if at least one geographical division-specific parameter regarding a first geographical division has already been stored in the second specification storing device and a second geographical division is selected, the at least one geographical division-specific parameter regarding the selected second geographical division is only read from the first specification storing device, and the at least one geographical division-specific parameter is stored into the second specification storing device.

6. The communication terminal apparatus according to claim 5, wherein the main program operates on the basis of the specification stored in the second specification storing device.

7. The communication terminal apparatus according to claim 5, further comprising an output device that outputs a parameter of the specification stored in the second specification storing device.

8. The communication terminal apparatus according to claim 5, wherein the first specification storing device includes a read-only non-volatile memory, and the second specification storing device includes a rewritable non-volatile memory.

9. The communication terminal apparatus according to claim 5, wherein the at least one parameter regarding a communication in a geographical division is a parameter regarding communication standards adopted in a geographical division.

10. A method of setting parameters in a communication terminal apparatus, comprising:

storing parameters for each of a plurality of geographical divisions and at least one operation-control program in a first memory location;

receiving a selection from an operator of a selected geographical division from the plurality of geographical divisions;

customizing a second memory location by storing the parameters for the selected geographical division that is selected by the operator in the second memory location, the parameters for the selected geographical division being read from the first memory location, wherein:

the parameters for each of the plurality of geographical divisions include at least one geographical division-specific parameter and at least one non-geographical division-specific parameter for each of the plurality of geographical divisions, if no geographical division-specific parameter has been stored in the second memory location, at least one geographical division-specific parameter regarding the selected geographical division and at least one non-geographical division-specific parameter regarding the selected geographical division are read from the first memory location, and the at least one geographical division-specific parameter and the at least one non-geographical division-specific parameter are stored into the second memory location, and if at least one geographical division-specific parameter regarding a first geographical division has already been stored in the second memory location and a second geographical division is selected, at least one geographical division-specific parameter regarding the selected second geographical division is only read from the first memory location, and the at least one geographical division-specific parameter is stored into the second memory location.

11. The method of claim 10, further comprising:

receiving a command to rewrite parameters stored in the second memory location, the parameters including a geographical division code.

12. The method of claim 10, wherein the at least one of the geographical division-specific parameter is a parameter regarding communication standards adopted in a geographical division.

13. A method of setting parameters in a communication terminal apparatus, comprising:

storing a plurality of specifications and at least one operation-control program in a first memory location;

receiving a selection from an operator of a selected specification from the plurality of specifications in the first memory location;

storing the selected specification in a second memory location;

determining whether the specification stored in the second memory location is a predetermined specification; and starting a main program if the specification stored in the second memory location is the predetermined specification, wherein:

the specifications includes parameters for each of a plurality of geographical divisions, the parameters include at least one geographical division-specific parameter and at least one non-geographical division-specific parameter for each of the plurality of geographical divisions, if no geographical division-specific parameter has been stored in the second memory location, at least one geographical division-specific parameter regarding the selected geographical division and at least one non-geographical division-specific parameter regarding the selected geographical division are read from the first memory location, and the at least one geographical division-specific parameter and the at least one non-geographical division-specific parameter are stored into the second memory location, and if at least one geographical division-specific parameter regarding a first geographical division has already been stored in the second memory location and a second geographical division is selected, at least one geographical division-specific parameter regarding the selected second geographical division is only read from the first memory location, and the at least one geographical division-specific parameter is stored into the second memory location.

14. The method of claim 13 wherein the main program operates on the basis of the specification stored in the second memory location.

15. The method of claim 13, further comprising outputting a parameter of the specification stored in the second memory location.

16. The method of claim 13, wherein the at least one parameter regarding the communication in a geographical division is regarding communication standards adopted in a geographical division.

* * * * *